United States Patent [19]

Breitbach et al.

[11] Patent Number: 5,709,292
[45] Date of Patent: Jan. 20, 1998

[54] CURRENT COLLECTOR FOR TRANSMITTING ENERGY BETWEEN A CONTACT WIRE AND A MOTOR COACH

[75] Inventors: Elmar Breitbach, Göttingen; Andreas Büter, Braunschweig, both of Germany

[73] Assignee: Deutsche Forschunganstalt fur Luft-und Raumfahrt e.V., Germany

[21] Appl. No.: 742,717

[22] Filed: Nov. 1, 1996

[30] Foreign Application Priority Data

Nov. 3, 1995 [DE] Germany ............ 195 40 913.2

[51] Int. Cl.⁶ .................................................. B60L 5/00
[52] U.S. Cl. .................................................. 191/65; 191/64
[58] Field of Search ................................... 191/50, 64, 65, 191/66, 69, 45 R, 52

[56] References Cited

U.S. PATENT DOCUMENTS

| 440,665 | 11/1890 | Thomson | 191/65 |
| 589,109 | 8/1897 | Wyman | 191/65 |
| 1,359,503 | 11/1920 | Hamilton | 191/65 |
| 5,124,510 | 6/1992 | Garfinkle | 191/65 |

FOREIGN PATENT DOCUMENTS

| 3641084A | 7/1987 | Germany . |
| 4230799C1 | 3/1994 | Germany . |

OTHER PUBLICATIONS

Aktive Stromabnehmer bei Hochgeschwindigkeitszugen, Daniel Huber et al., Elektrische Bahnen 91 (1993) 12, 8 pages.

,, 406,9 km/h''—Weltrekord auf der Schiene–Energieubertragung bei der Rekordfahrt des ICE der DB, Wolfgang Harprecht, et al., Elektrische Bahen eb, 86. Jahrgang, Heft Sep. 1988, 22 pages.

*Primary Examiner*—Mark T. Le
*Attorney, Agent, or Firm*—Isaf, Vaughan & Kerr; Charles H. Fails

[57] ABSTRACT

A current collector is provided for transmitting energy between a contact wire and a motor coach. The current collector has a first support arm (11) connected to the motor coach and being raisable about a first horizontal axis (28); and a pair of second support arms (8 and 18) connected to the free end of the first support arm rotatably about a second horizontal axis (28). The pair of the second support arms (8 and 18) is connected to an extension element (14) protruding over the second horizontal axis (28). Further, the current collector has a guide bar (13) rotatably connected with the motor coach and the extension element (14); and at least one collector shoe which is supported on the free end of the pair of the second support arms (8 and 18). The extension element (14) is connected to each of the two second support arms (8 and 18) via a torsional actuator (16 and 17, respectively) being arranged on the second horizontal axis (28). A control device (25) is provided which controls the two torsional actuators (16 and 17) dependent on the signal (21, 22) of at least one displacement, acceleration or force sensor arranged on the current collector.

10 Claims, 3 Drawing Sheets

6,709,292

CURRENT COLLECTOR FOR TRANSMITTING ENERGY BETWEEN A CONTACT WIRE AND A MOTOR COACH

FIELD OF THE INVENTION

The invention relates in general to a current collector for transmitting energy between a contact wire and a motor coach. More particularly, the invention relates to a current collector having a first support arm connected to the motor coach and raisable about a first horizontal axis; a pair of second support arms connected to the free end of the first support arm rotatably about a second horizontal axis, the pair of the second support arms having an extension element protruding over the second horizontal axis; a guide bar rotatably connected to the motor coach and the extension element; and at least one collector shoe which is supported on the free end of the pair of the second support arms. In particular, the invention relates to a current collector that is used with fast rail vehicles.

BACKGROUND OF THE INVENTION

A current collector of the type described at the beginning is known from the article ""406,9 km/h" —Weltrekord auf der Schiene —Energieübertragung bei der Rekordfahrt des ICE der DB", elektrische Bahnen eb, Vol. 86, No. 9/1988, pages 268 to 289. The first support arm, the extension element of the second support arms and the guide bar are forming a four-bar chain together with the motor coach. With the aid of this four-bar chain, the pair of the second support arms is also raised about the second horizontal axis in raising the first support arm about the first horizontal axis. This second raising movement is due to the guide bar acting upon the extension element of the pair of the second support arms protruding over the second horizontal axis. In the current collector called SSS 87, the pair of the second support arms is a part of a second four-bar chain to which further belong a second guide bar also rotatably connected to the first support arm, and a supporting piece connected to the free ends of the second support arms and the second guide bar. The supporting piece is provided for a rocker supporting two collector shoes. In raising the first and the second support arms by a lifting device for the first support arm, both collector shoes are guided in parallel directions upwards to the contact wire and pressed against the contact wire until a predetermined contact force of about 120 Newton is reached. In pressing the collector shoes against the contact wire, the contact wire is lifted in dependence on the stiffness of its upward support. The support of the contact wire is achieved by a contact wire suspension. The stiffness of the contact wire suspension is maximum within its suspension points and minimum in the middle between the suspension points. This leads to varying contact forces of the collector shoes over the longitudinal extension of the contact wire, if the first support arm is raised to a constant extend about the first horizontal axis. Where the contact wire is lifted more, the contact force decreases. Further influences on the contact force result from the flow against the current collector because of the relative wind. Here, it is possible to use wind deflector plates to compensate such aerodynamic effects. However, the results of the wind deflector plates are different in a tunnel and on the open line. Additionally, strong variations in the contact force occur due to the wind deflection plates especially during tunnel entry and exit. Dynamic effects join the previous effect, i.e., the initial variation in the contact force leads to dynamic excitations of the contact wire suspension and of the contact wire, which feed back to the contact force.

Therefore, it is the problem of the invention to disclose a current collector of the type described at the beginning, in which the contact force of the collector shoe against the contact wire can be kept constant.

SUMMARY OF THE INVENTION

According to the invention this problem is solved in that the extension element of the pair of the second support arms is connected with each of the two second support arms via an torsional actuator being arranged on the second horizontal axis; and that a control means is provided which controls the two torsional actuators in dependence on the signal of at least one displacement, acceleration or force sensor arranged on the current collector. Apart from the natural elasticity of the material used, the extension element of the pair of the second support arms and the two second support arms are always rigidly coupled in the state of the art. In the new current collector a torsional actuator is provided in this place, which enables to purposefully apply a torsional force between the extension element and each of the second support arms, i.e. a torque on the respective support arm about the second horizontal axis. The two torsional actuators are controlled in dependence on the signal of at least one displacement, acceleration or force sensor located on the current collector. The signal taken into account by the control means should have a correlation as close as possible to the contact force of the collector shoe against the contact wire. However, it is also possible that the sensor determines a value the variation of which has any effect on the contact force. This value can be the flow velocity of the relative wind against the current collector or against a deflector plate arranged on the current collector. The control means processes the signal to keep constant the contact force of the collector shoes against the contact wire. Preferably, the control means operates as a closed loop control, if a direct measure for the contact force of the collector shoe against the contact wire is available as an input signal.

For the new current collector, torsional actuators are required by which torsional forces can be applied very fast, as the disturbances of the contact force have relative high frequencies with fast rail vehicles. In one possible embodiment, the torsional actuators each have a tube section made of an anisotropic fibre compound material and arranged coaxially with the second horizontal axis, a linear actuator loading the tube section in the direction of the second horizontal axis. Due to loading the anisotropic fibre compound material torsional forces between the free ends of the tube section arise This effect can, for example, also be observed with a helical spring. Fibre compound material is here to be understood as a matrix with embedded fibres. Herein, anisotropic fibre compound material means that the fibres have a predominant orientation in the matrix. This predominant orientation runs spirally around the axis of the tube section.

With such fibre compound materials, torsional forces between the free ends of the tube section are observed in loading the tube section with both pressure and tension. However, in the new current collector it is important that the connection of the extension element of the pair of the second support arms and the respective second support arm has a relative high basic stiffness. Also, the known linear actuators, as piezo-electrical and magneto-strictive actuators, may be loaded with high pressure forces but only with low tension forces. Additionally, the torsional actuator should have a construction as simple as possible.

Under these boundary conditions it turns out to be advantageous, if the tube section of the anisotropic fibre compound material is pre-stressed with pressure, the respective linear actuator loading the tube section between its two free ends with tension. The pressure pre-stress on the tube section ensures that the linear actuator is not subjected to any tensional load but is itself pre-stressed with pressure. The actuator pre-stressed with pressure also counteracts to a further distortion of the tube section by pressure, so that a sufficient basic stiffness of the torsional actuator is given.

The arrangement is particular compact, if the linear actuator is located within the respective tube section.

In an other embodiment, each of the torsional actuators comprises a tube section made of spring-elastic material, which is arranged coaxially with the second horizontal axis and slit open along said axis, at least one linear actuator loading at least one axial and tangential end region of the tube section in direction parallel to the second horizontal axis. In such torsional actuators the phenomenon of the vault distortion by torsion works inversely, i.e., a vault distortion is introduced to achieve a torsion of the tube section. The points of application of the vault distortion need not to be the furthest end regions in axial and tangential direction. In an individual case, it can rather be especial advantageous, if the points of application are taken back a little from the furthest end regions in axial and/or tangential direction, because the ratio of the transmission of the introduced vault distortion into the desired torsion of the tube section is increased. It is understood, that with a slit-open tube section of the torsional actuators operating according to the principle of vault distortion also, attention is to be payed to a sufficient basic stiffness. This is to be taken into consideration in the selection of the spring-elastic material for the tube section. In principle, it would also be possible here to use an anisotropic fibre compound material. Such a tube section could be both loaded in the direction of the second horizontal axis and subjected to a vault distortion to summon up the desired torsional forces. With torsional actuators which operate according to the principle of vault distortion only, spring steel is particularly suited for forming the slit-open tube sections. Here, a continuous supporting element shaped like a cylinder jacket can be associated with each of the tube sections, so that the distortion of the slit-open tube section is restricted to the introduced vault distortion and the corresponding torsion, while apart from this, the connection of the extension element of the pair of the second support arms to the respective second support arm is rigid to a large extend.

In each torsional actuator operating according to the principle of vault distortion two end regions of the slit open tube section opposing each other in axial and tangential directions can be loaded in opposite directions. To this end, two or just a single actuator can be provided. In case of a single actuator attention is to be payed that the actuator is only loaded in its linear direction of operation.

In a preferred embodiment of the torsional actuators operating according to the principle of vault distortion, the slit open tube section is surrounded by a further tube section slit open along the second horizontal axis, the slot line of which radially opposes the slot line of the inner tube section with regard to the second horizontal axis. Herein, the rotational symmetry of the torsional actuator about the second horizontal axis is enhanced.

Additionally, advantageous possibilities of arranging the linear actuators arise, in which each of the linear actuators loads both slit-open tube sections. In this way, each linear actuator can load both tube sections in at least one axial and tangential end region, said regions being located at opposing ends of the torsional actuator. Here, it is relative simple to ensure that the respective actuator is only loaded in its linear direction of operation.

Preferably, the linear actuators loading both slit open tube sections are located in an annular space between the two tube sections. Herein, a very compact construction of the torsional actuator is achieved.

The arrangement of each of the torsional actuators between the extension element of the pair of the second support arms and one of the support arms enables the control means to control the two torsional actuators separately from each other, if this is useful for keeping a constant contact force, and particularly, for actively damping dynamic excitations of the current collector.

In the following, the invention is further explained and described by means of embodiment examples. Therein,

DETAILED DESCRIPTION

Figure 1:
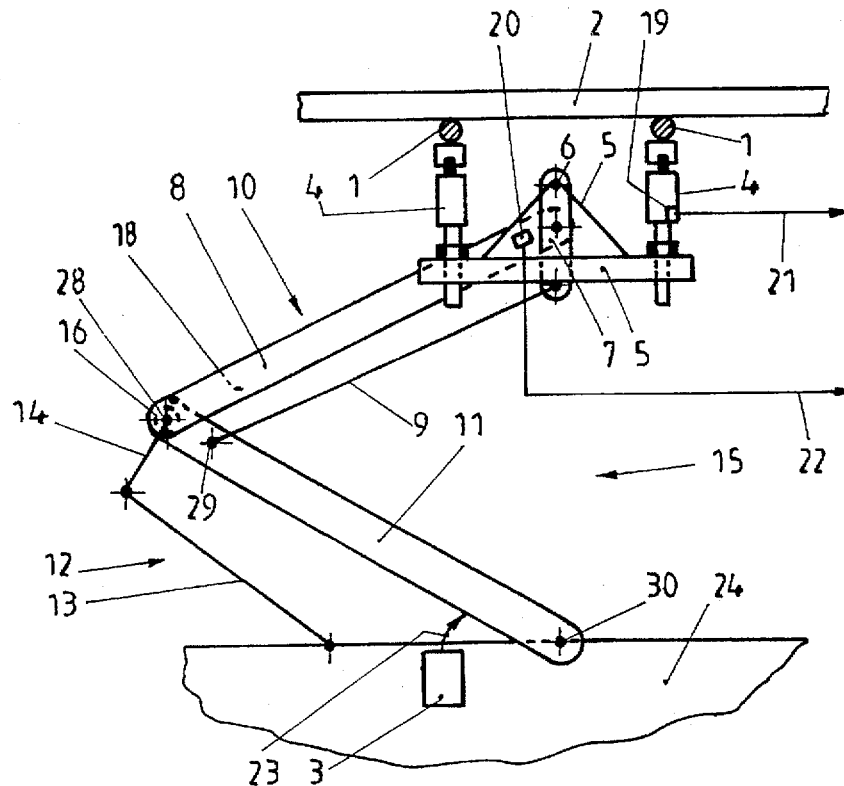
FIG. 1 shows the current collector in a schematized side view.

The current collector 15 schematically depicted in FIG. 1 is used for lifting and pressing two collector shoes 1 against a contact wire 2. The collector shoes 1 are supported by end-side spring-loaded legs on a rocker 5. In total, two spring-loaded legs 4 are provided per each collector shoe 1. However, only one spring-loaded leg per each collector shoe can be seen in FIG. 1.

The rocker 5 is connected to a supporting piece 7 tilting about a horizontal axis 6. The supporting piece 7 is rotatably connected to the upper end of a pair of support arms 8 and 18. Further, a guide bar 9 is rotatably linked to the supporting piece 7. Both the pair of the support arms 8 and 18 and the guide bar 9 are rotatably linked to a support arm 11. Thus, altogether there is a four-bar chain called upper pantograph 10. The support arm 11 is a part of a further four-bar chain. The support arm 11 itself is connected to a motor coach 24 rotatably about a horizontal axis 30. Further, a guide bar 13 is rotatably connected to the motor coach 24. The guide bar 13 is rotatably linked to an extension element 14 of the pair of the support arms 8 and 18. This extension element 14 can be rotated about the horizontal axis 28 together with the support arms 8 and 18. The lower four-bar chain is also called lower pantograph 12. A lifting device 3 is provided for raising the lower, first support arm 11 in direction of arrow 23 about the first horizontal axis 30. With raising the first support arm 11, the pair of the second support arms 8 and 18 is also raised about the second horizontal axis 28 due to the coupling of the lower pantograph 12 with the upper pantograph 10. Here, the extension element 14 of the pair of the second support arms 8 and 18 is not rigidly connected with the second support arms 8 and 18, as it is apparent from the detail according FIG. 2. The support arms 8 and 18 are rather connected with the extension element 14 via torsional actuators 16 and 17. The torsional actuators 16 and 17 have a relative high torsional stiffness. However, it is at the same time possible to purposefully apply torques between the extension element 14 and the second support arms via the torsional actuators 16 and 17 also. To this end, the torsional actuators 16 and 17 are controlled by a control means 25. The control means 25 operates in dependence on a force signal 21 from a force sensor 19, which measures, beneath one of the collector shoes 1, the contact force of said collector shoe against the contact wire 2, and on an acceleration signal 22 from a acceleration sensor 20 at the upper end of the support arm 8. Additionally, further displacement, force and/or acceleration sensors can be arranged on the current collector, whose signals are taken into account by the control means. The control means 25 controls the torsional actuators 16 and 17 in such a way that the contact force of the collector shoes 1 against the contact wire 2 is kept constant to a extend as large as possible. To this end, the stiffnesses of the support of the contact wire 2 by a contact wire suspension, which are varying over the longitudinal extension of the contact wire 2, are to be compensated. Further, dynamic excitations of the current collector are to be dampened, and aerodynamic influences of the relative wind blowing against the current collector are to be compensated.

Figure 2:
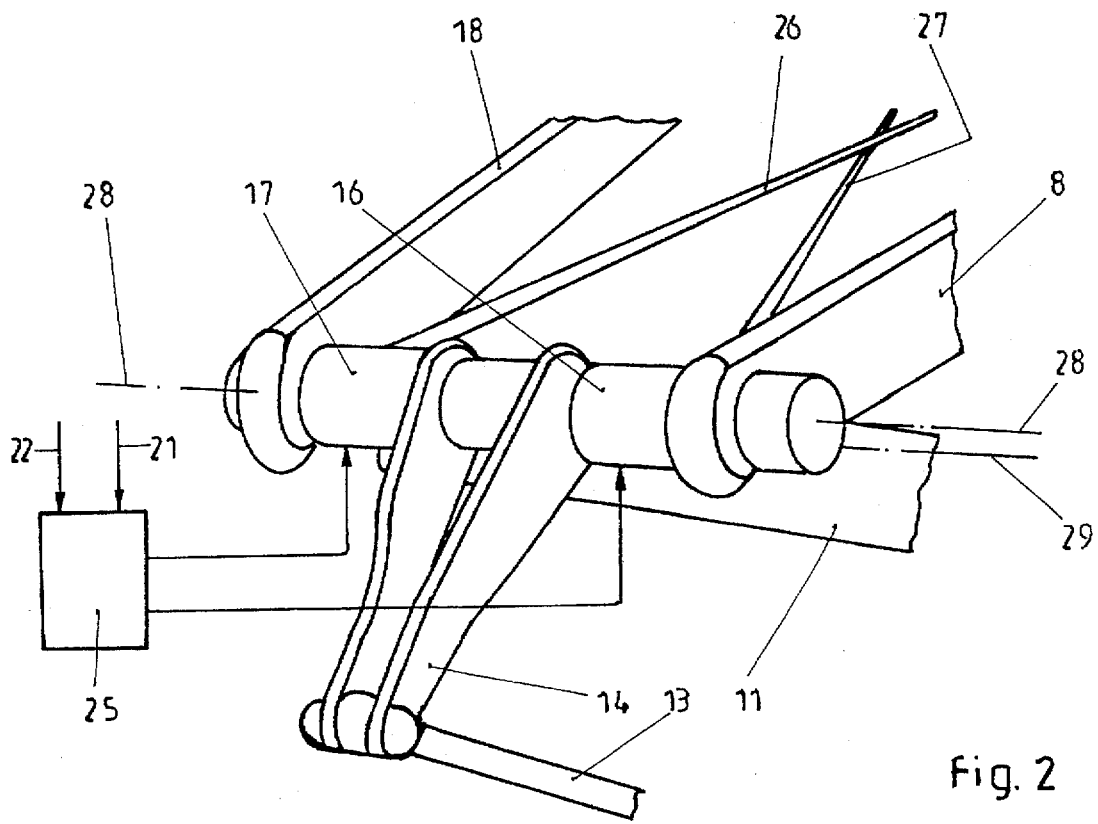
FIG. 2 shows a detail of the current collector in a perspective view.

From the detail according to FIG. 2, bracing wires 26 and 27 are also apparent by which the pair of the second support arms is braced to increase its stiffness. However, the torsional actuators 16 and 17 can be controlled separately from each other to compensate influences on the current collector which are unsymmetrical with regard to the plane of symmetry of the current collector. The guide bar 9 is connected to the support arm 11 rotatably about the axis 29 drafted in FIG. 2.

Figure 3:
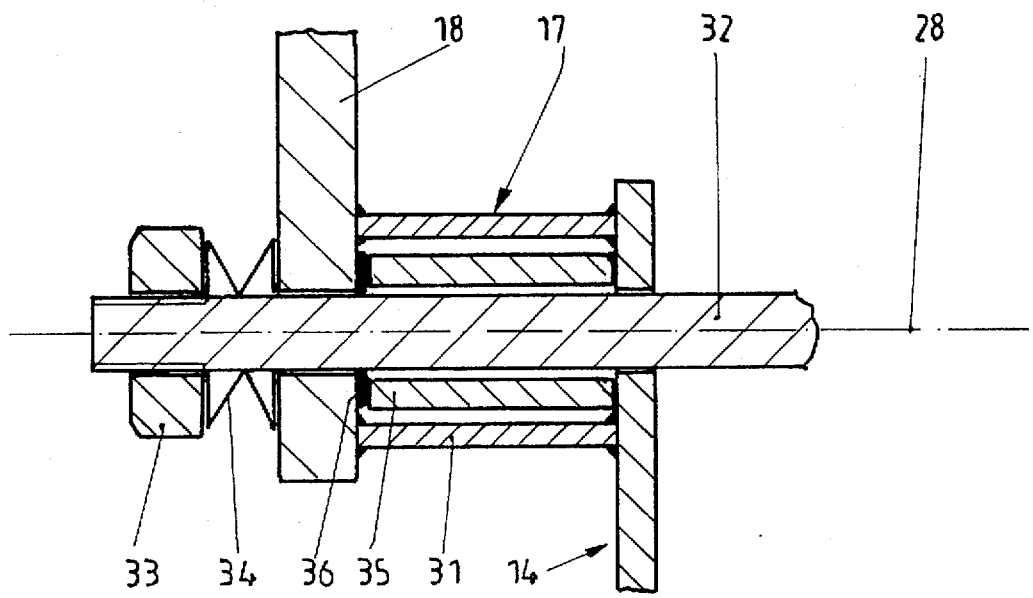
FIG. 3 shows a first embodiment of the torsional actuator.
Figure 4:
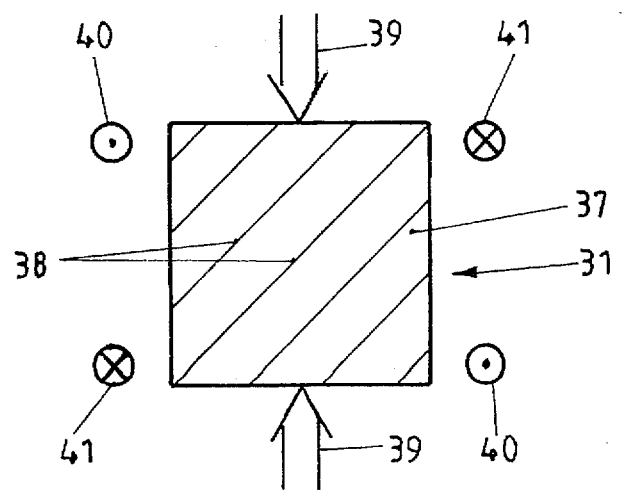
FIG. 4 shows a detail of the torsional actuator according to FIG. 3.

FIG. 3 shows one possible construction of one of the torsional actuators 17 between the extension element 14 and the second support arm 18 in a longitudinal section along the second horizontal axis 28. The torsional actuator 17 comprises a tube section 31 of an anisotropic fibre compound material. The tube section 31 is arranged coaxially with the second horizontal axis 28. The ends of the tube section 31 are rigidly connected to the extension element 14 on one side and to the second support arm 18 on the other side. Therein, a common bearing bar 32 extends through both the extension element 14 and the support arm 18 as well as through the actuator 17 which is arranged in between. A nut 33 is screwed on the bearing bar 32 which presses the second support arm 18 against the extension element 14 via Belleville springs 34. Herein, the tube section 31 arranged in between is pre-stressed with pressure. A ring-shaped linear actuator 35 is arranged in the annular space between the tube section 31 and the bearing bar 32. The linear actuator 35 is supported on one side on the extension element 14 and on the other side, via a sliding ring 36, on the second support arm 18. Thus, with operating the linear actuator 35 the tube section 31 is loaded with pressure, which means that the pressure pre-stress applied 31 via the Belleville springs 34 is partly taken away. The torsional forces associated with different pressure stress on the tube section 31 are apparent from FIG. 4. FIG. 4 shows the tube section 31 in a schematized side view. The tube section 31 is consisting of fibre compound material having a matrix 37 and fibres 38 embedded in the matrix 37. The fibres 38 are arranged in parallel, and orientated spirally with regard to the axis of the tube section 31. A longitudinal distortion of the tube section 31 occurs with a variation of a pressure pre-stress on the tube section 31 in direction of the arrows 39. Due to the anisotropic construction of the fibre compound material, this longitudinal distortion comes along with a relative twisting of the two ends of the tube section 31, which is indicated by symbols 40 and 41. In this way, torsional forces can be applied between the extension element 14 and the second support arm 18 by the linear actuator 35 according to FIG. 3. Such a correlation between an axial force application, i. e. a distortion, and a torsion is, for example, also observed with a helical spring.

Figure 5:
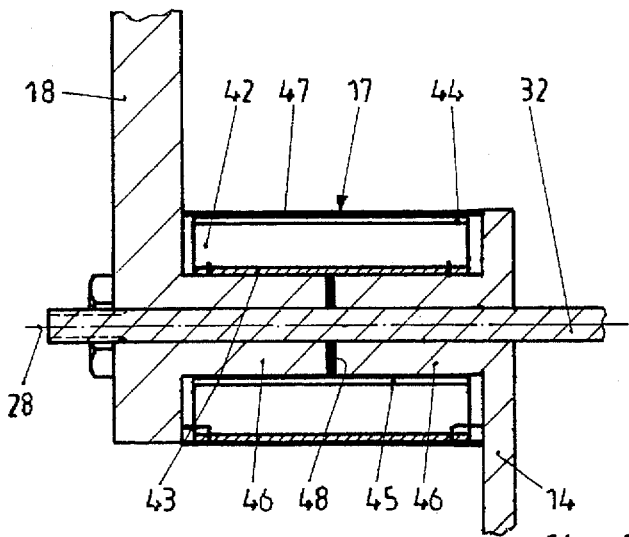
FIG. 5 shows a second embodiment of the torsional actuator.

The embodiment of the torsional actuator 17 which is depicted in FIG. 5 in a longitudinal section along the second horizontal axis 28 is based on another principle of operation. Here, two slit-open tube sections 42 and 43, which are arranged in each other and coaxially with the second horizontal axis 28, are provided between the extension element 14 and the second support arm 18. The slots 44 and 45 of the two tube sections 42 and 43 extend parallel to the axis 28, and oppose each other with regard to the axis 28. In the region opposing its slot 44 or 45, respectively, each of the tube sections 42 and 43 is rigidly attached at one end to the extension element 14 and at the opposing end to the support arm 18. Therein the inner slit-open tube section 43 lies, with a tension directed radially inwards, against a guide bush 46, which is formed partly by the extension element 14 and partly by the support arm 18; while the outer slit-open tube section lies, with a tension directed radially outwards, against a guide bushing 47. Due to this support the coaxial orientation of the two slit-open tube sections 42 and 43 is stabilized. However, it is at the same time also possible to generate a torque about the axis 28 between the extension element 14 and the support arm 18 by means of the slit-open tube sections 42 and 43. For a corresponding relative movement, a sliding ring 48 is provided between the two parts of the guiding bush 46.

Figure 6:
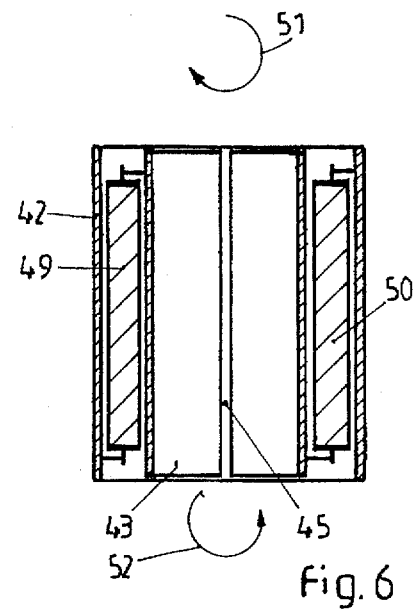
FIG. 6 shows a detail of the torsional actuator according to FIG. 5 in a cross-section.
Figure 7:
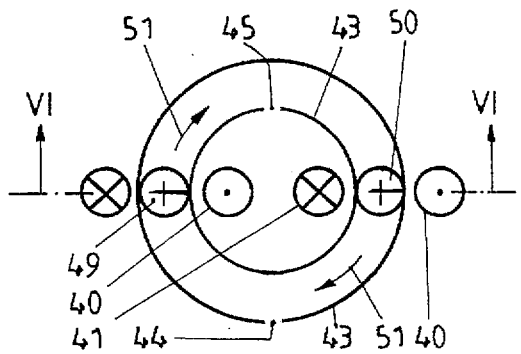
FIG. 7 shows a detail of the torsional actuator according to figure 5 in a top view.
Figure 8:
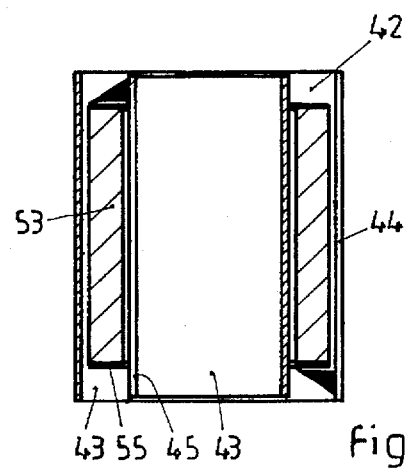
FIG. 8 shows a detail of a torsional actuator modified with regard to FIG. 5 in a first cross-sections.
Figure 9:
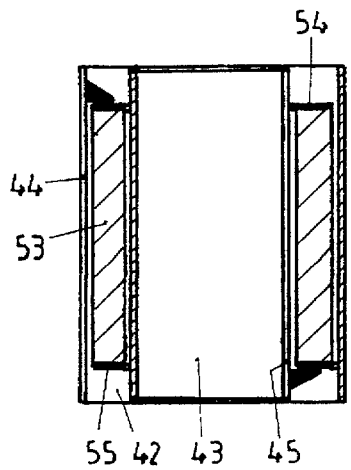
FIG. 9 shows a detail of a torsional actuator modified with regard to FIG. 5 in a second cross-section.
Figure 10:
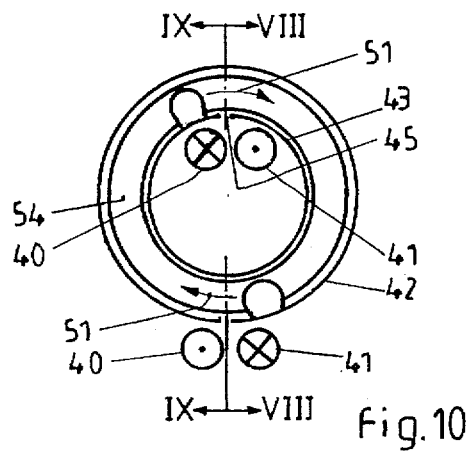
FIG. 10 shows a detail of a torsional actuator modified with regard to FIG. 5 in a top view.

How the torsion between both ends of the torsional actuator 17 is generated, is apparent from FIGS. 6 and 7. There, both slit-open tube sections are depicted in a longitudinal section and a top view. Two linear actuators 49 and 50 act upon the tube sections 42 and 43. The points of action are located in axial and tangential edge regions of the respective tube section. A vault distortion of the tube sections 42 and 43 which is indicated by symbols 40 and 41 in FIG. 7 can be initiated by means of the actuators 49 and 50, the vault distortion leading to a relative twisting of the two end regions of the tube sections in direction of the arrows 51 and 52, respectively. According to FIG. 6, each of the linear actuators 49 and 50 acts upon the slit-open tube sections 42 and 43 in axially opposing points. Therein, the points are not in the absolute tangential end regions of the respective tube section. The embodiment according to FIGS. 8 to 10 is different. There, a single ring-shaped linear actuator 53 is provided. This linear actuator 53 acts upon both slit-open tube sections 42 and 43 via sliding rings 54 and 55. The points of action are located in the absolute axial and tangential edge regions of the tube section, i. e. at their ends in the proximity of the slots 44 or 45, respectively. The sliding rings 54 and 55 ensure that the linear actuator 53 is only stressed in operation direction. In the embodiment according to FIGS. 6 and 7, this can be achieved by rotatably connecting the linear actuators 49 and 50 to the two tube sections. The effect of the vault distortion applied to the tube sections 42 and 43 via the ring-shaped linear actuator 53 is apparent from FIG. 10, in which the arrows 51 indicate the rotation direction of the upper end of the torsional actuator 17 with the torsion initiated.

While preferred embodiments of the invention have been disclosed herein, it is understood by those skilled in the art that variations and modifications thereof can be made without departing from the spirit and scope of the invention, as set forth in the following claims. Moreover, the corresponding structures, materials, acts, and equivalence of all means or step plus functiomn elements in the claimed elements are intended to include any structure, material, or acts for performing the functions in combination with other claimed elements as specifically claimed.

LIST OF REFERENCE NUMERALS

| | |
|---|---|
| 1 collector shoe | 11 first support arm |
| 2 contact wire | 12 lower pantograph |
| 3 lifting device | 13 guide bar |
| 4 spring-loaded leg | 14 extension element |
| 5 rocker | 15 current collector |
| 6 axis | 16 torsional actuator |
| 7 supporting piece | 17 torsional actuator |
| 8 second support arm | 18 second support arm |
| 9 guide bar | 19 force sensor |
| 10 upper pantograph | 20 acceleration sensor |
| 21 force signal | 31 tube section |
| 22 acceleration signal | 32 bearing bar |
| 23 arrow | 33 nut |
| 24 motor coach | 34 Belleville spring |
| 25 control means | 35 linear actuator |
| 26 bracing wire | 36 sliding ring |
| 27 bracing wire | 37 matrix |
| 28 second horizontal axis | 38 fibre |
| 29 axis | 39 arrow |
| 30 first horizontal axis | 40 symbol |
| 41 symbol | 51 arrow |
| 42 tube section | 52 arrow |
| 43 tube section | 53 linear actuator |
| 44 slot | 54 sliding ring |
| 45 slot | 55 sliding ring |
| 46 guide bush | |
| 47 guide bushing | |
| 48 sliding ring | |
| 49 linear actuator | |
| 50 linear actuator | |

We claim:

1. A current collector for transmitting energy between a contact wire and a motor coach, the current collector having a first support arm connected to the motor coach and being raisable about a first horizontal axis a pair of second support arms connected to the free end of the first support arm and being rotatably supported about a second horizontal axis, each one of said pair of second support arms being connected to an extension element protruding over the second horizontal axis; a guide bar rotatably connected to the motor coach and the extension element; and at least one collector shoe supported on a free end of the pair of the second support arms, wherein the extension element is connected with each of the two second support arms via a torsional actuator being arranged on the second horizontal axis, and a control means is provided which controls the two torsional actuators in dependence on the signal of at least one sensor means arranged on the current collector.

2. The current collector according to claim 1, wherein the torsional actuators each has a tube section made of an anisotropic fibre compound material and is arranged coaxially with the second horizontal axis, and wherein a linear actuator loads the tube section in the direction of the second horizontal axis.

3. The current collector according to claim 2, wherein the tube section is pre-stressed with pressure, and the respective linear actuator loads the tube section with tension.

4. The current collector according to claim 2, wherein the linear actuator is located within the respective tube section.

5. The current collector according to claim 1, wherein each of the torsional actuators comprises a tube section made of spring-elastic material arranged coaxially with the second horizontal axis and slit open along said axis, and at least one linear actuator loading at least one axial and tangential end region of each said tube section in a direction parallel to the second horizontal axis.

6. The current collector according to claim 5, wherein the two end regions of the tube section opposing each other in the axial and tangential directions of each said torsional actuator are loaded in opposite directions.

7. The current collector according to claim 5, wherein in each torsional actuator the slit open tube section is surrounded by a further tube section slit open along the second horizontal axis, the slot of which radially opposes the slot of the inner tube section with regard to the second horizontal axis.

8. The current collector according to claim 7, wherein each said linear actuator loads both tube sections in at least one axial and tangential end region, said regions being located at opposing ends of the torsional actuator.

9. The current collector according to claim 7, wherein the linear actuators are located in an annular space between both tube sections.

10. The current collector according to claim 1 wherein the control means controls each of the two torsional actuators separately from each other.

* * * * *